Patented Aug. 16, 1938

2,126,975

UNITED STATES PATENT OFFICE 2,126,975

XANTHATION OF CELLULOSE

George A. Richter, Berlin, N. H., assignor to Brown Company, Berlin, N. H., a corporation of Maine No Drawing. Application June 15, 1937, Serial No. 148,304

9 Claims. (Cl. 260—100)

This invention relates to the xanthation of cellulose and more especially to a xanthating reaction on cellulose that takes place in the presence of an added ingredient capable of promoting reaction on the cellulose and of improving the quality of the reaction product.

The xanthation of cellulose may be effected by various processes and under various conditions, but the reaction generally involves the admixture of carbon bisulphide as the xanthating reagent with cellulose and aqueous caustic soda solution. According to the usual process, the carbon bisulphide is added to aged soda-cellulose crumbs as the crumbs are being tumbled in a rotary drum; and the xanthated crumbs are then dissolved in caustic soda solution to form viscose syrup of the desired composition. The crumbs subjected to xanthation in the usual process are prepared by soaking sheets of wood pulp in caustic soda solution of appropriate strength, squeezing excess solution from the sheets, shredding the moist sheets, and aging the shreds or crumbs of soda-cellulose under controlled temperature for a definite period of time. According to another process, the carbon bisulphide is added in liquid form to a thick suspension of the cellulose particles or fibers in caustic soda solution; and the proportions of the various ingredients are calculated to yield in a single mixing step a cellulose xanthate solution or viscose syrup of the desired cellulose content and causticity.

In accordance with the present invention, the xanthation of cellulose is performed in the presence of an organic liquid, preferably volatile, that is miscible with both the caustic soda solution and the carbon bisulphide participating in the xanthating reaction and that hence serves in the course of the reaction as a vehicle or carrier for the carbon bisulphide whose solubility in caustic soda solution is very small. In other words, the organic liquid used for the purposes hereof, being miscible with both caustic soda solution and carbon bisulphide, induces quick and substantially uniform diffusion of the carbon bisulphide through the caustic soda solution to the bodies of the individual cellulose fibers or cellulose particles, wherefore, the resulting cellulose xanthate yields a viscose syrup of relatively very low content of incompletely xanthated or unxanthated cellulose. While various organic liquids possessed of miscibility with both caustic soda solution and carbon bisulphide may be used for the purposes hereof, including more especially ketones, such as acetone, or such equivalents as furfural, acetone has been found to be particularly satisfactory herein as a promoter of the xanthating reaction; and not only is it available at comparatively low cost in practically all industrial regions but, by reason of its relatively low boiling point, can be readily removed from the xanthated crumbs or viscose syrup, if undesired therein.

The invention hereof is applicable to good advantage in preparing viscose syrup by a one-step xanthating process, especially when the cellulose is refractory or resists complete xanthation in preparing viscose syrup for artificial silk, films, and analogous manufactures, for instance, syrup of a cellulose content and causticity of about 6% to 10% each, based on the weight of the syrup. In carrying out such one-step xanthation accordant with the present invention, the cellulose may be admixed with caustic soda solution to form a thick, substantially homogeneous suspension of the cellulose particles or fibers in the solution. Thus, sheets of wood pulp or other suitable cellulose fiber, preferably of low solution viscosity, may serve as the starting material; and they may be treated as disclosed in my application Serial No. 58,539, filed January 10, 1936, Patent 2,117,037, in which case, the sheets are cut into small pieces, for instance, pieces about one-half inch square, and the pieces soaked in caustic soda solution and then disintegrated in the solution to form a fiber suspension substantially devoid of fiber aggregates to which the liquid carbon bisulphide and acetone may be added. Specifically, the small pieces or chips cut from the sheets or pulpboards may be introduced into a xanthating vessel or mixer along with caustic soda solution of 18% strength and in volume calculated to associate with the fiber or bone-dry cellulose an equal amount by weight of caustic soda. The pieces or chips may be permitted to soak in the strong or mercerizing caustic soda solution at about 15° to 25° C. for about thirty minutes to two hours, at the end of which time they have been so softened and swollen by the mercerizing solution that they may be readily disintegrated or defiberized. At such time, water is added to the vessel or mixer to reduce the causticity of the caustic soda solution to about 10% and the mixer operated to agitate the soaked pieces or chips and thus to resolve them into the ultimate or individual fibers which, as they are released or liberated, become suspended in the caustic soda solution. Agitation or mixing is continued until a thick, salve-like suspension of fibers substantially devoid of lumps or fiber aggregates is had, whereupon liquid carbon bisulphide in the amount of about 35% to 40%, based on the dry weight of the cellulose, and containing about 10% of its own weight of acetone is added to such suspension and the mixed ingredients are subjected to continued agitation or mixing preferably at a temperature of about 15° to 20° C. After all the ingredients have been agitated or mixed for about four hours, it is found that the xanthating reaction has gone to completion, as is evidenced by the substantial clarity of the resulting viscose syrup and its excellent filterability. The resulting viscose syrup is thus eminently satisfactory for artificial silk and film manufacture. Accordingly, diluting water may be added to the syrup to adjust its cellulose and caustic soda content to about 7% each, which content is that ordinarily desired for artificial silk and film manufacture. It might be noted that tests of the syrup under a microscope show its gel count to be markedly less than a syrup prepared under similar conditions but in the absence of acetone as a promoter of the xanthating reaction. Again, the subjection of the viscose syrup hereof to a standard filterability or filter-capacity test shows it to be remarkably superior to a viscose syrup prepared under similar conditions but in the absence of acetone as a promoter of the xanthating reaction. These tests show that the acetone has surprising value as a promoter of the xanthating reaction.

The value of acetone as a promoter of the xanthating reaction has also been demonstrated in the usual xanthating process involving the reaction of carbon bisulphide with aged soda-cellulose crumbs as they are being tumbled in a conventional xanthating drum. Thus, two such xanthating reactions were carried out under similar conditions, excepting that in the case of one batch of reacting materials, 10% acetone, based on the carbon bisulphide, was present substantially uniformly throughout the soda-cellulose crumbs when they were exposed to the reaction of the carbon bisulphide vapor in the amount of 40%, based on the dry weight of the cellulose. Each of the resulting batches of cellulose xanthate crumbs was dissolved as customarily in dilute caustic soda solution to form viscose syrup containing 7.4% cellulose and 6.5% caustic soda, based on the weight of the syrup. When the two viscose syrups were examined and evaluated in terms of their gel count and filterability, it was found that the syrup containing the cellulose xanthate prepared in the presence of the acetone had much better clarity, lower gel count, and higher filterability than the viscose syrup containing the cellulose xanthate prepared in the absence of the acetone. As indicative of the superior quality of the first-named syrup prepared by the process hereof, it might be noted that the filterability or filter-capacity of such syrup was found to be 1,500 cc. by a standard filtration test, whereas the filterability or filter-capacity of the second-named syrup was determined to be 500 cc. by the same test.

The presence of acetone in viscose syrups prepared by the process hereof does not detract from the stability or other significant qualities of such syrups. If desired, however, the acetone may be removed from the viscose syrup or from the xanthated crumbs, that is, after it has played its desired role in promoting the xanthating reaction. Because of the relatively low boiling point of acetone, it may be removed or expelled by vaporization from the viscose syrup or from the xanthated crumbs at sufficiently low temperature to avoid undesirable decomposition or spoilage of the viscose syrup or the cellulose xanthate crumbs. Thus, in the usual process of xanthation, wherein the xanthating drum is usually subjected to a vacuum of about 20 inches after the xanthating reaction has been completed, practically all of the acetone used to promote the xanthating reaction may be vaporized or distilled from the reaction product along with the residual carbon bisulphide and be condensed and recovered for reuse. In the one-step xanthating process, such acetone as is used to promote the xanthating reaction may be recovered from the resulting viscose by placing the reaction vessel or mixer containing such viscose under a suitable vacuum at the completion of the reaction. In those instances when the viscose syrup prepared by the one-step xanthating process is ripened in the xanthating vessel at somewhat elevated temperature, say, 50° C., the vaporization and recovery of the acetone by placing the vessel under suitable vacuum may be accomplished readily during the ripening period.

It is to be understood that the amount of acetone or its equivalent employed for the purposes hereof is subject to considerable variation. Thus, acetone may be used in amount less than 10% of the weight of the carbon bisulphide serving as the xanthating agent, although it is generally preferable to use acetone in an amount ranging from about 5% to 20%, based on the weight of the carbon bisulphide entering into the xanthating reaction. More acetone might be used, but the amount stated is generally sufficient to effect the desired improvements. It might be noted that, by virtue of the use of acetone or its equivalent, accordant with the invention hereof, it becomes possible, other factors being kept constant, to reduce the amount of carbon bisulphide necessary for realizing the desired quality of cellulose xanthate or cellulose xanthate solution, the particular amount of carbon bisulphide used in any particular case depending upon such factors as the kind of cellulose being xanthated, the amount of acetone or its equivalent present in the sphere of the xanthating reaction, and the temperature, amount of caustic soda, and other conditions maintained in the sphere of the xanthating reaction. It might be further noted that the invention hereof comprehends the presence of acetone in the sphere of the xanthating reaction no matter which ingredient or ingredients entering into the reaction are treated with the acetone or its equivalent and no matter what the composition of the resulting cellulose xanthate or viscose solution may be. For instance, in the case of the one-step xanthating process, it is usually preferable to add the acetone or its equivalent to the liquid carbon bisulphide before it is admixed with the thick suspension of cellulose fiber. In the case of the usual xanthating process, on the other hand, it may be preferable to add the acetone or its equivalent to the caustic soda solution of about 18% strength in which the sheets of wood pulp or the like are soaked. In such latter case, the steeping or soaking liquor may contain an amount of acetone or its equivalent designed to ensure the desired amount of acetone or its equivalent throughout the aged soda cellulose crumbs, namely, the crumbs produced by squeezing excess steeping liquor from the sheets, shredding the squeezed sheets, and aging the resulting shreds or crumbs.

I claim:

1. A process of xanthating cellulose, which involves admixing carbon bisulphide with cellulose and caustic soda solution in contact with a liquid ketone miscible with both the carbon bisulphide and the caustic soda solution.

2. A process of xanthating cellulose, which involves admixing carbon bisulphide with cellulose and caustic soda solution in contact with acetone.

3. A process of xanthating cellulose, which involves admixing carbon bisulphide with cellulose and caustic soda solution in contact with acetone in an amount of about 5% to 20% of the weight of the carbon bisulphide.

4. A process of preparing viscose syrup, which involves admixing liquid carbon bisulphide with a suspension of cellulose in caustic soda solution in contact with a liquid ketone miscible with both the carbon bisulphide and the caustic soda solution.

5. A process of preparing viscose syrup, which involves admixing liquid carbon bisulphide with a suspension of cellulose in caustic soda solution in contact with acetone in an amount of about 5% to 20% of the weight of the carbon bisulphide.

6. A process of preparing viscose syrup, which involves admixing liquid carbon bisulphide with a suspension of cellulose in caustic soda solution in contact with acetone in an amount of about 5% to 20% of the weight of the carbon bisulphide, the carbon bisulphide, cellulose, and caustic soda solution being admixed in amounts calculated to yield viscose syrup of a cellulose content and causticity of about 6% to 10% each.

7. A process of xanthating cellulose, which involves exposing soda-cellulose containing acetone to the action of carbon bisulphide vapor.

8. A process of xanthating cellulose which involves exposing soda-cellulose to the action of carbon bisulphide vapor in contact with about 5% to 20% of acetone, based on the weight of the carbon bisulphide.

9. A process of xanthating cellulose, which involves admixing carbon bisulphide with cellulose and caustic soda solution in contact with acetone; and, after the xanthating reaction has been effected, vaporizing the acetone from the reaction product under sub-atmospheric pressure.

GEORGE A. RICHTER.